May 31, 1955
A. DOUTY ET AL
2,709,781
INSTRUMENT FOR DETERMINING THE ELECTRICAL
CONDUCTANCE OF LIQUIDS
Filed June 20, 1952
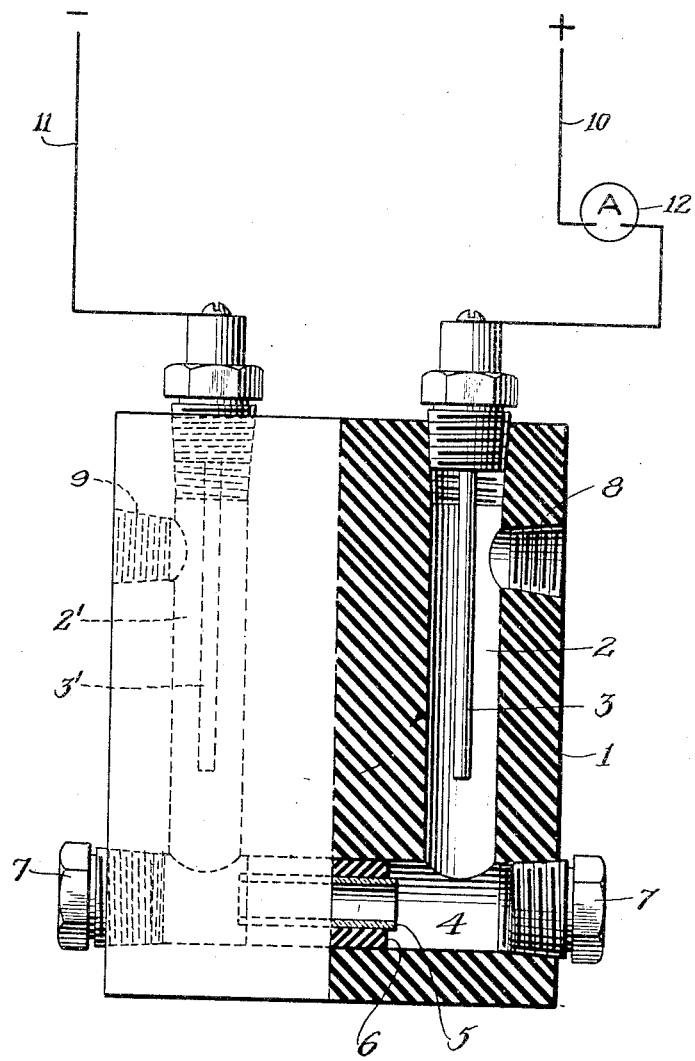
INVENTORS
Alfred Douty
Walter Graham Smith
By Synnestvedt & Lechner
ATTORNEYS

United States Patent Office 2,709,781
Patented May 31, 1955

2,709,781

INSTRUMENT FOR DETERMINING THE ELECTRICAL CONDUCTANCE OF LIQUIDS

Alfred Douty, Elkins Park, and Walter Graham Smith, Ambler, Pa., assignors to American Chemical Paint Company, Ambler, Pa., a corporation of Delaware Application June 20, 1952, Serial No. 294,614

4 Claims. (Cl. 324—30)

This invention relates to the art of determing the electrical conductance of liquids and is particularly concerned with the provision of an improved so-called conductivity cell or instrument by means of which the electrical conductivity of a liquid may be conveniently determined.

The principal objects of the invention include the provision of a conductivity cell of unusually simple construction and readily variable cell constant; the provision of a cell of highly adaptable character which is readily usable to meet a variety of industrial conditions; the provision of a cell which embodies certain readily replaceable parts which enable the user to quickly adapt the instrument to suit specific conditions with a minimum stock of supplemental parts; and, generally, to improve the efficiency, longevity and accuracy of an instrument of this kind as well as to reduce its cost.

By way of background, it might be pointed out that there are many industries in which the electrical conductance or conductivity of solutions employed may be used as a guide to their replenishment and even, in many instances, as the actuating variable for automatic control apparatus. Examples of such industries are found in the cleaning and other surface treatment of metals, in the bottle washing industry, etc. Furthermore, concentrations and conductances of solutions used in various processes or, indeed, in different stages of a given process, may vary widely. It will be seen, therefore, that in order to keep the resistance of that portion of the electrical measuring or control circuit which includes the conductivity cell, within convenient limits, it is necessary that cells be chosen which have suitable cell constants for each solution and concentration range employed. For reasons of this kind, therefore, in the engineering or planning of such systems, it has been convenient heretofore to have available a set of conductance cells of a range of cell constants.

The present invention contemplates the provision of a conductance cell which, by a very simple adjustment, may be used for an extremely wide range of concentrations so that a single instrument will lend itself exceptionally well to a wide variety of present day industrial needs. It comprises an enclosure, the walls of which are non-conducting, which enclosure is divided into three parts or chambers, two of which are relatively large in cross-section and in each of which is mounted an electrode. A third portion of the space enclosed by the walls of the device constitutes a communicating passageway connecting the other two portions and this third portion is of relatively small cross-section and of sufficient length so that, when considered as part of the electrical path between the two electrodes, its resistance comprises by far the greater portion of the total resistance between the two electrodes. This restricted portion is so constructed and arranged as to be readily removable from the assembly and replaced with some other restricted portion having a greater or less diameter whereby the construction may be adapted for use with liquids of varying conductivity. These restricted portions are standardized to produce cells of known cell constant. If the liquid or electrolyte to be measured has a relatively high degree of conductivity, the restricted portion should be of relatively small cross-section. Conversely, if the liquid or electrolyte has a conductivity of a low order, the diameter of the restricted portion should be relatively large. The lengths of the restricted portions also may be variable within reasonable limits.

The objects and advantages of the invention will be more fully understood and appreciated by those skilled in the art upon reference to the accompanying drawing which illustrates a preferred embodiment. The single figure of the drawing is a half side elevation and a half vertical section through a conductivity cell embodying our invention, the embodiment being especially adapted for the measurement of a large variety of liquids which are being pumped through a pipe line.

In the drawing:

The body or walls 1 of the cell are constructed of a suitable non-conducting material, the design being such as to provide a pair of chambers 2 and 2' of relatively large cross-section. Within each chamber is located an electrode 3 and 3' and it should be noted that the spacing of the electrodes in the assembly is not critical because the parts are so constructed and arranged as to constitute that portion of the electrical path falling within the chambers 2, 2', a negligible proportion only of the over-all resistance of the electrical path between the electrodes.

It will be noted that the electrode assemblies are readily removable by virtue of being threaded into position as shown in the drawing. This facilitates cleaning of the instrument. We prefer to arrange the chambers 2 and 2' and the electrodes 3 and 3' in a generally parallel relationship as well as at a considerable angle (a right angle is illustrated for the sake of example) to a communicating passageway 4, which connects the chambers 2 and 2' and within which passageway is located a removable and readily replaceable bushing-like member 5 of relatively small cross-section as compared to the cross-section of the chambers 2 and 2'. The passageway through the bushing 5 constitutes the greater portion of the resistance in the path between the electrodes.

The member 5 is preferably mounted in a resilient holding or supporting member 6 (also tubular and surrounding the bushing 5). Rubber would be a suitable material for this purpose and the unit 5—6 is made readily removable and interchangeable with other units so as to provide for electrical paths of either greater or lesser electrical resistance and of known cell constant.

The passageway 4 within which is located the removable unit 5—6 is extended through the construction preferably at right angles to the chambers 2 and 2' (as shown) and the ends thereof are closed as by means of removable plugs 7, which not only provide for access to and replacement of the unit 5—6 but also facilitate cleaning of the cell.

The liquid whose conductance is to be determined is circulated through the instrument by means of the openings 8 and 9.

The positive and negative electrical connections for the electrodes are indicated at 10 and 11 and an ammeter 12 is placed in the circuit.

In the construction of cells embodying our invention, we find it convenient and preferable to make the main body of the cell or instrument out of some suitable non-conducting plastic material which is chemically inert to the liquid whose conductance is to be measured and, as a general rule, we prefer to make the restricted portion 5 out of precision-ground glass tubing. The tubes, of course, can be of varying diameter so that the device can be readily adapted to varying uses in the matter already set forth.

It will be noted that the electrical path shown in the accompanying drawing is U-shaped but, of course, it is apparent that this path may be of practically any shape although we prefer the arrangement illustrated. In some situations it may be linear in nature whereby to lend itself exceptionally well to placement in straight line pipes. If desired, a series of variously sized members 5—6 may be mounted in a carrying cylinder or barrel so that the desired size may be quickly moved into line by the simple expedient of "dialing" the desired cell constant into proper position in the instrument. In such a design it will be necessary, of course, to provide suitable gasketing means to insure that there is no leakage of liquid and we have found that a satisfactory material for this purpose is a synthetic rubber such as neoprene.

We claim:

1. An instrument for determining the electrical conductance of liquids comprising a rigid cell body constructed of non-conducting material, said cell body having a pair of chambers of relatively large cross-section, an electrode in each chamber, a passageway of restricted cross-section establishing communication between said chambers, and a normally closed access opening in the wall of the cell body in alignment with said restricted passageway through which opening the replaceable member can be inserted or withdrawn without disturbing the spatial relationship of the other parts of the instrument, the major portion of the total resistance of the cell body being within said restricted passageway and said passageway being formed as a prestandardized replaceable member adapted to produce, when in place, a cell of predetermined cell constant.

2. An instrument according to claim 1, wherein the electrode chambers are disposed at a substantial angle to the passageway whereby to provide a substantially U-shaped flow path through the instrument.

3. An instrument for determining the electrical conductance of liquids comprising a rigid cell body constructed of non-conducting material, said cell body having a pair of chambers of relatively large cross-section, an electrode in each chamber, and a passageway of restricted cross-section establishing communication between said chambers, the major portion of the total resistance of the cell being within said restricted passageway and said passageway being formed as a prestandardized replaceable member adapted to produce, when in place, a cell of predetermined cell constant and said replaceable member being mounted in a resilient supporting member.

4. An instrument according to claim 3, wherein a liquid connection to each chamber is provided by means of which connections the liquid whose conductance is to be measured may be circulated through the cell.

References Cited in the file of this patent

UNITED STATES PATENTS

| | | |
|---|---|---|
| 1,341,790 | Edelman | June 1, 1920 |
| 2,122,363 | Christie | June 28, 1938 |
| 2,258,045 | Christie | Oct. 7, 1941 |
| 2,486,432 | Otto | Nov. 1, 1949 |
| 2,656,508 | Coulter | Oct. 20, 1953 |